(12) United States Patent
Martens et al.

(10) Patent No.: US 11,475,017 B2
(45) Date of Patent: Oct. 18, 2022

(54) ASYNCHRONOUS DATA ENRICHMENT FOR AN APPEND-ONLY DATA STORE

(71) Applicant: Microsoft Technology Licensing, LLC, Redmond, WA (US)

(72) Inventors: Benjamin Walter Martens, Woodinville, WA (US); Nicholas Anthony Swanson, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 220 days.

(21) Appl. No.: 16/293,634

(22) Filed: Mar. 5, 2019

(65) Prior Publication Data

US 2020/0285647 A1 Sep. 10, 2020

(51) Int. Cl.
*G06F 16/2457* (2019.01)
*G06F 12/0802* (2016.01)
*G06F 16/248* (2019.01)

(52) U.S. Cl.
CPC .... *G06F 16/24575* (2019.01); *G06F 12/0802* (2013.01); *G06F 16/248* (2019.01); *G06F 2212/608* (2013.01)

(58) Field of Classification Search
CPC ............. G06F 16/24575; G06F 16/245; G06F 16/248; G06F 16/24; G06F 12/0802; G06F 12/08; G06F 2212/608; G06F 2212/45
See application file for complete search history.

(56) References Cited

U.S. PATENT DOCUMENTS

| | | | |
|---|---|---|---|
| 8,843,435 B1 * | 9/2014 | Trefler | H04L 67/42 707/600 |
| 10,746,560 B2 * | 8/2020 | Luchner | G01C 21/367 |
| 2004/0088481 A1 * | 5/2004 | Garney | G06F 12/0866 711/113 |
| 2006/0026154 A1 * | 2/2006 | Altinel | G06F 16/24552 |

(Continued)

OTHER PUBLICATIONS

"Overview Kusto", Retrieved From https://kusto.azurewebsites.net/docs/query/index.html, Retrieved on Dec. 28, 2018, 1 Page.

*Primary Examiner* — Pierre M Vital
*Assistant Examiner* — Vy H Ho
(74) *Attorney, Agent, or Firm* — Ray Quinney & Nebeker P.C; James Bullough

(57) ABSTRACT

A method for asynchronous data enrichment may include receiving a query that includes a request for information about an entity. The query may specify a particular time range. In response to receiving the query, event information that is associated with the entity and that corresponds to the specified time range may be combined with additional information that is relevant to the query and that corresponds to the specified time range. The event information may initially be written to a record in an append-only data store. The additional information may become available after the event information, such that the additional information is not included in the record in the append-only data store. Instead, the additional information may initially be written to one or more additional data stores. Both the event information and the additional information may be provided in response to the query.

16 Claims, 7 Drawing Sheets

(56) References Cited

U.S. PATENT DOCUMENTS

| | | | |
|---|---|---|---|
| 2012/0239869 A1* | 9/2012 | Chiueh | G06F 12/0246 |
| | | | 711/103 |
| 2014/0310232 A1* | 10/2014 | Plattner | G06F 16/24539 |
| | | | 707/602 |
| 2016/0124900 A1* | 5/2016 | Balakrishnan | G06F 15/7885 |
| | | | 712/18 |
| 2016/0132790 A1* | 5/2016 | Weissman | G06Q 30/0206 |
| | | | 705/5 |
| 2016/0357809 A1* | 12/2016 | Patel | G06F 16/2471 |
| 2017/0052976 A1* | 2/2017 | Verma | G06F 16/24535 |
| 2017/0193039 A1* | 7/2017 | Agrawal | G06F 16/245 |
| 2017/0344614 A1* | 11/2017 | Devaraj | G06F 16/2477 |
| 2018/0253491 A1* | 9/2018 | Moraleda | G06V 20/49 |
| 2019/0236156 A1* | 8/2019 | Fanghaenel | G06F 12/0891 |
| 2020/0216026 A1* | 7/2020 | Price | G08B 13/19647 |

\* cited by examiner

ASYNCHRONOUS DATA ENRICHMENT FOR AN APPEND-ONLY DATA STORE

CROSS-REFERENCE TO RELATED APPLICATIONS

N/A

BACKGROUND

In general terms, the term "data analytics" refers to the process of examining data sets in an effort to gain insights about the information they contain. Data analytics techniques can reveal trends, patterns, and correlations that would otherwise be hidden in large amounts of data. These trends and metrics can then be used to optimize processes to increase the overall efficiency of a business or system.

Data analytics can be performed for a variety of different purposes. For example, manufacturing companies can analyze data about the runtime, downtime, and work queue for various machines in order to better plan workloads so that the machines operate more efficiently. Marketing organizations can analyze consumer purchase and/or survey data to determine the outcomes of advertising campaigns and to guide decisions for consumer targeting. Scientists and researchers can analyze test results to verify or disprove scientific models, theories and hypotheses. There are many other examples of how data analysis techniques can be used, including applications related to real-time fraud detection, call center optimization, intelligent traffic management, management of smart power grids, and so forth.

Data analytics techniques are often applied to big data. The term "big data" refers to data sets that are too large or complex for traditional data-processing application software to adequately deal with. Big data is often characterized by one or more of the following factors: there is too much data to handle easily, the speed of data flowing in and out makes it difficult to analyze, and/or the range and type of data sources are too great to assimilate. In other words, the term big data is typically applied to data sets that have high volume, high velocity, and/or extensive variety.

The term "cloud analytics" refers to performing at least some aspects of data analytics via cloud computing. The term "cloud computing" refers to the delivery of computing services (e.g., servers, storage, databases, networking, software, analytics) over the Internet. Cloud computing systems are built using principles of distributed systems, in which a plurality of distinct processing, memory, storage, and communication components are connected by one or more communication networks. A cloud computing system typically includes one or more data centers, which may be located in different geographical areas. Each data center typically includes a large number (e.g., hundreds or thousands) of host machines, which may be organized into clusters. Each host machine may be used to run one or more virtual machines. In this context, the term "host machine" refers to a physical computer system, while the term "virtual machine" refers to an emulation of a computer system on a host machine. In other words, a virtual machine is a program running on a host machine that acts like a virtual computer. Like a physical computer, a virtual machine runs an operating system and one or more applications.

In some systems, information about events related to various entities may be written to an append-only data store. In this context, the term "append-only" means that records can only be added, not modified. In other words, once a record has been written to an append-only data store, the record cannot subsequently be modified. However, new records may be added to an append-only data store.

An append-only data store may be useful in situations where massive amounts of information should be stored in such a way that the information can be subsequently queried. The use of an append-only data store makes it possible to index the information more efficiently, thereby facilitating faster querying. With an append-only data store, once a record has been indexed, it is known that the record is not going to change. Therefore, there is less re-reading of the data store to restructure indexes than there would be with other types of data stores (e.g., relational databases). This makes the use of an append-only data store more efficient for large datasets because it is known that the index is not going to be invalidated by a change to the data. Because the indexing is so much more efficient, it is therefore easier to build a large number of indexes automatically without user oversight.

However, the use of an append-only data store also presents certain challenges, especially where information about an event becomes available at different times. If information that is available soon after an event occurs is written to a record in an append-only data store, that record cannot be updated to include additional information that subsequently becomes available. This can make it difficult to provide all of the relevant information that is available when the append-only data store is queried.

SUMMARY

The present disclosure is generally related to asynchronous data enrichment for an append-only data store. In accordance with one aspect of the present disclosure, a method for asynchronous data enrichment may be performed in connection with a system in which information about events related to a plurality of entities is written to an append-only data store, and additional information is written to one or more additional data stores.

A query that includes a request for information about an entity may be received. The query may specify a particular time range. In response to receiving the query, event information that is associated with the entity and that corresponds to the specified time range may be combined with additional information that is relevant to the query and that corresponds to the specified time range. The event information may initially be written to a record in an append-only data store. The additional information may become available after the event information, such that the additional information is not included in the record in the append-only data store. Instead, the additional information may initially be written to one or more additional data stores. In accordance with the present disclosure, however, the additional information may be combined with the event information so that both the event information and the additional information are provided in response to the query.

In some embodiments, the event information and at least some of the additional information may be cached to a cache data store. This caching may occur a predefined time period after the event information is written to the append-only data store. Depending on the time range that is specified in the query and how recently caching has been performed, providing a response to the query may involve (a) searching a cache data store, (b) searching the append-only data store and one or more additional data stores, or (c) a combination of (a) and (b).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

The present disclosure is generally related to a system in which information about events related to various entities is written to an append-only data store. Such a system may be configured to receive and respond to queries for information about the entities. When responding to such a query, it is typically desirable to provide all of the relevant information that is available. However, not all of the relevant information may become available at the same time. Some information about an event may be available soon after the event occurs, whereas other information may not be available until a later time. However, if information that is available soon after an event occurs is written to a record in an append-only data store, that record cannot be updated to include additional information that subsequently becomes available.

To address this problem, the present disclosure proposes an asynchronous data enrichment process in which the information that is written to the append-only data store is supplemented with additional information that subsequently becomes available. When a query for information about an entity is received, information may be obtained from a record in the append-only data store. This information may be combined with additional information that did not become available until a later time and was therefore not included in the record in the append-only data store. Both the information in the append-only data store and the additional information that subsequently became available may be provided in response to the query.

Figure 1:
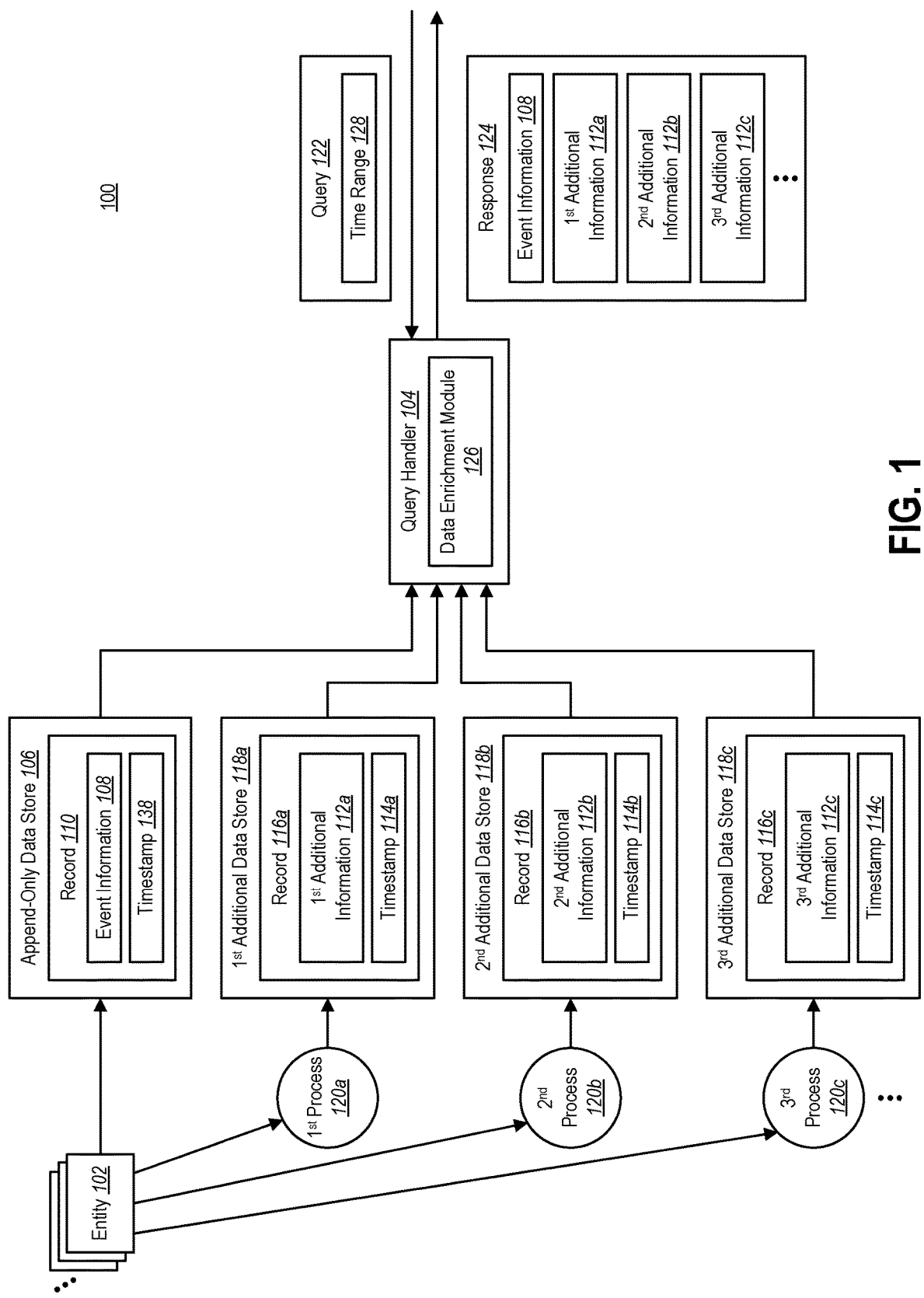
FIG. 1 illustrates an example of a system that implements an asynchronous data enrichment process in accordance with the present disclosure.

FIG. 1 illustrates an example of a system 100 in which aspects of the present disclosure may be utilized. The system 100 includes a plurality of entities 102. The system 100 may be configured to receive and respond to queries for information about the entities 102. The system 100 is shown with a query handler 104 for providing this functionality.

Information about events related to the entities 102 is written to an append-only data store 106. The entities 102 themselves may write information to the append-only data store 106, and/or there may be another service (or combination of services) that monitors the entities 102 and writes information to the append-only data store 106.

As used herein, the term "event" refers to something that takes place with respect to one or more entities 102. For example, in some embodiments the entities 102 may be components of a computer system, and an event may be something that happens to one or more such components. Some examples of events include shutting down unexpectedly, experiencing hardware failure, overheating, booting up, etc. In some embodiments, an event may be something that happens to a component (e.g., a virtual machine) in a cloud computing system.

When an event occurs with respect to a particular entity 102, some information 108 about the event may be written to a record 110 in the append-only data store 106. This information 108 may be referred to herein as event information 108. The event information 108 may be written to the append-only data store 106 relatively soon after the event occurs. However, there may be additional information that may be useful for analyzing the event. This additional information may be about the event itself and/or about the entity 102 involved with the event. However, this additional information may not be available when the event information 108 is available. Moreover, it may not necessarily be known in advance when, or even if, the additional information will become available.

If the additional information does become available, it may be written to other data stores. FIG. 1 shows first additional information 112a and a corresponding timestamp 114a being written to a record 116a in a first additional data store 118a, second additional information 112b and a corresponding timestamp 114b being written to a record 116b in a second additional data store 118b, and third additional information 112c and a corresponding timestamp 114c being written to a record 116c in a third additional data store 118c. In some embodiments, the additional data stores 118a-c may also be append-only data stores. Alternatively, at least some of the additional data stores 118a-c may be configured so that existing records can be modified. For example, at least some of the additional data stores 118a-c can be standard relational databases. FIG. 1 also shows a plurality of processes, including a first process 120a, a second process 120b, and a third process 120c. The processes 120a-c monitor the entities 102 and provide information about the entities 102. When additional information becomes available that is related to the event information 108 in the append-only data store 106, the processes 120a-c may write the additional information 112a-c to the additional data stores 118a-c.

When a query 122 is received for event information 108 associated with an entity 102, it may be desirable for the response 124 to the query 122 to include all of the relevant information that is available when the query 122 is received. For example, if the query 122 is received after the additional information 112a-c has become available, then it may be desirable for the response 124 to the query 122 to include the additional information 112a-c as well as the event information 108 that is included in the record 110 in the append-only data store 106.

It can be difficult, however, to provide the additional information 112a-c as well as the event information 108 that was initially written to the append-only data store 106. Once a record has been written to the append-only data store 106, the record cannot be subsequently modified. Therefore, the record 110 in the append-only data store 106 that includes the event information 108 cannot be modified afterward to include the additional information 112a-c that subsequently becomes available.

To address this problem, the system 100 is configured to combine the event information 108 that is initially written to the append-only data store 106 with the additional information 112a-c that subsequently becomes available. The query handler 104 is shown with a data enrichment module 126 that provides this functionality. Both the event information 108 that was initially written to the append-only data store 106 and the additional information 112a-c that subsequently becomes available may then be provided in a response 124 to the query 122.

A query 122 for event information 108 about an entity 102 may specify a particular time range 128. In response to receiving the query 122, the query handler 104 may obtain event information 108 that is associated with the entity 102 and that corresponds to the specified time range 128 from the record 110 in the append-only data store 106.

In addition to the event information 108 in the append-only data store 106, there may be additional information 112a-c that is relevant to the query 122. Under some circumstances, the additional information 112a-c may be considered to be relevant to the query 122 if the additional information 112a-c corresponds to the specified time range 128 and is associated with an entity 102 that is specified in the query 122. In other situations, the additional information 112a-c may be considered to be relevant to the query 122 if the additional information 112a-c corresponds to the specified time range 128, even if the additional information 112a-c is not directly associated with an entity 102 that is specified in the query 122.

If the query 122 is received after the additional information 112a-c has become available, and if the timestamps 114a-c associated with the additional information 112a-c correspond to the time range 128 that is specified in the query 122, then the event information 108 from the record 110 in the append-only data store 106 may be combined with the additional information 112a-c that is subsequently received. Both the event information 108 and the additional information 112a-c may be included in a response 124 to the query 122. In this way, an asynchronous data enrichment process in accordance with the present disclosure enables all of the relevant information that is available to be provided in response 124 to the query 122.

Figure 2:
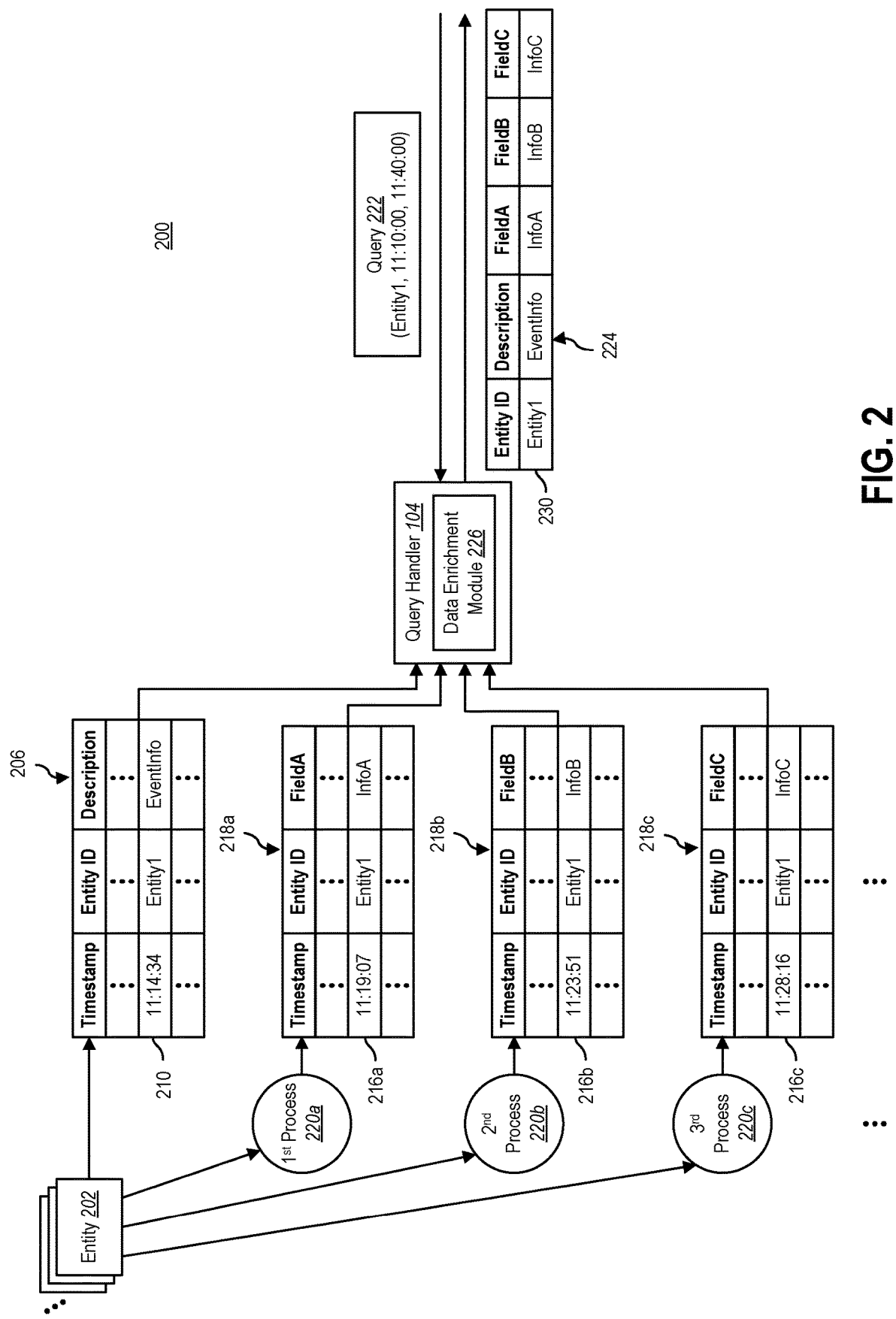
FIG. 2 illustrates a more detailed example of the system shown in FIG. 1.

FIG. 2 illustrates another example of a system 200 in which aspects of the present disclosure may be utilized. The system 200 includes a plurality of entities 202. A query handler 204 receives and responds to queries for information about the entities 202. Information about events related to the entities 202 is written to an append-only data store. In the depicted example, the append-only data store is represented as a table 206, which will be referred to herein as an events table 206.

When an event occurs with respect to a particular entity 202 (e.g., "Entity1"), some information about the event (which is represented as "EventInfo" in FIG. 2) may be written to a record 210 in the events table 206. If additional information that may be useful for analyzing the event subsequently becomes available, this additional information may be written to additional data stores. In FIG. 2, these additional data stores are represented as additional tables. FIG. 2 shows first additional information (which is represented as "InfoA") and a corresponding timestamp being written to a record 216a in a first additional table 218a, second additional information (which is represented as "InfoB") and a corresponding timestamp being written to a record 216b in a second additional table 218b, and third additional information (which is represented as "InfoC") and a corresponding timestamp being written to a record 216c in a third additional table 218c. A plurality of processes (including a first process 220a, a second process 220b, and a third process 220c) monitor the entities 202 and write the additional information to the additional tables 218a-c.

A specific example will now be discussed in relation to the system 200 shown in FIG. 2. Suppose that an event related to an entity occurs, and that information about the event (which is represented as "EventInfo") is written to the events table 206 soon after the event occurs, at 11:14:34. (All times herein are written in HH:MM:SS format.)

A few minutes after the event occurs, at 11:19:07, the first process 220a determines additional information ("InfoA") about the event and writes this additional information to the first additional table 218a. A few minutes later, at 11:23:51, the second process 220b determines additional information ("InfoB") about the event and writes this additional information to the second additional table 218b. A few minutes later, at 11:28:16, the third process 220c determines additional information ("InfoC") about the event and writes this additional information to the third additional table 218c.

As noted above, when a query 222 is received for event information associated with an entity 202, it is typically desirable for the response 224 to the query 222 to include all of the relevant information that is available when the query 222 is received. For instance, in the depicted example, suppose that a query 222 is received for event information about Entity1 that has a timestamp between 11:10:00 and 11:40:00. In the response 224 to this query 222, it may be desirable to provide "EventInfo" from the events table 206, "InfoA" from the first additional table 218a, "InfoB" from the second additional table 218b, and "InfoC" from the third additional table 218c.

It can be difficult, however, to provide all of this information, because the events table 206 is an append-only table. In other words, once a record has been written to the events table 206, the record cannot be subsequently modified. Thus, the record 210 in the events table 206 that includes "EventInfo" cannot be modified to include the additional information that subsequently becomes available (e.g., "InfoA", "InfoB", "InfoC"). To address this problem, the system 200 includes a data enrichment module 226 that is configured to combine the information (e.g., "EventInfo")

that was initially written to the append-only events table 206 with the additional information (e.g., "InfoA", "InfoB", "InfoC") that subsequently becomes available and is written to the additional tables 218a-c.

When a query 222 is received asking for any event information about Entity1 that has a timestamp between 11:10:00 and 11:40:00, the data enrichment module 226 identifies all of the event information about Entity1 corresponding to the specified time range (namely, "EventInfo" in the events table 206) and also any additional information that is relevant to the event (namely, "InfoA" in the first additional table 218a, "InfoB" in the second additional table 218b, and "InfoC" in the third additional table 218c). The data enrichment module 226 creates a single record 230 that includes all of this information and returns this record 230 in a response 224 to the query 222.

Thus, the data enrichment module 226 supplements the data that was initially available about the event (namely, "EventInfo") with additional data that subsequently becomes available about the event (namely, "InfoA", "InfoB", and "InfoC"). This data enrichment process may be considered to be asynchronous because it is unknown when (or even if) the additional data about the event will become available.

For the sake of clarity, the example shown in FIG. 2 is highly simplified. The events table 206 and the additional tables 218a-c are each shown with just a single record. Of course, these tables 206, 218a-c would typically include many records. In fact, there may be a massive amount of information being written to the events table 206 and the additional tables 218a-c, such that these tables may include large numbers (e.g., billions) of records. To improve performance when dealing with such large amounts of information, a caching feature may be utilized.

Figure 3:
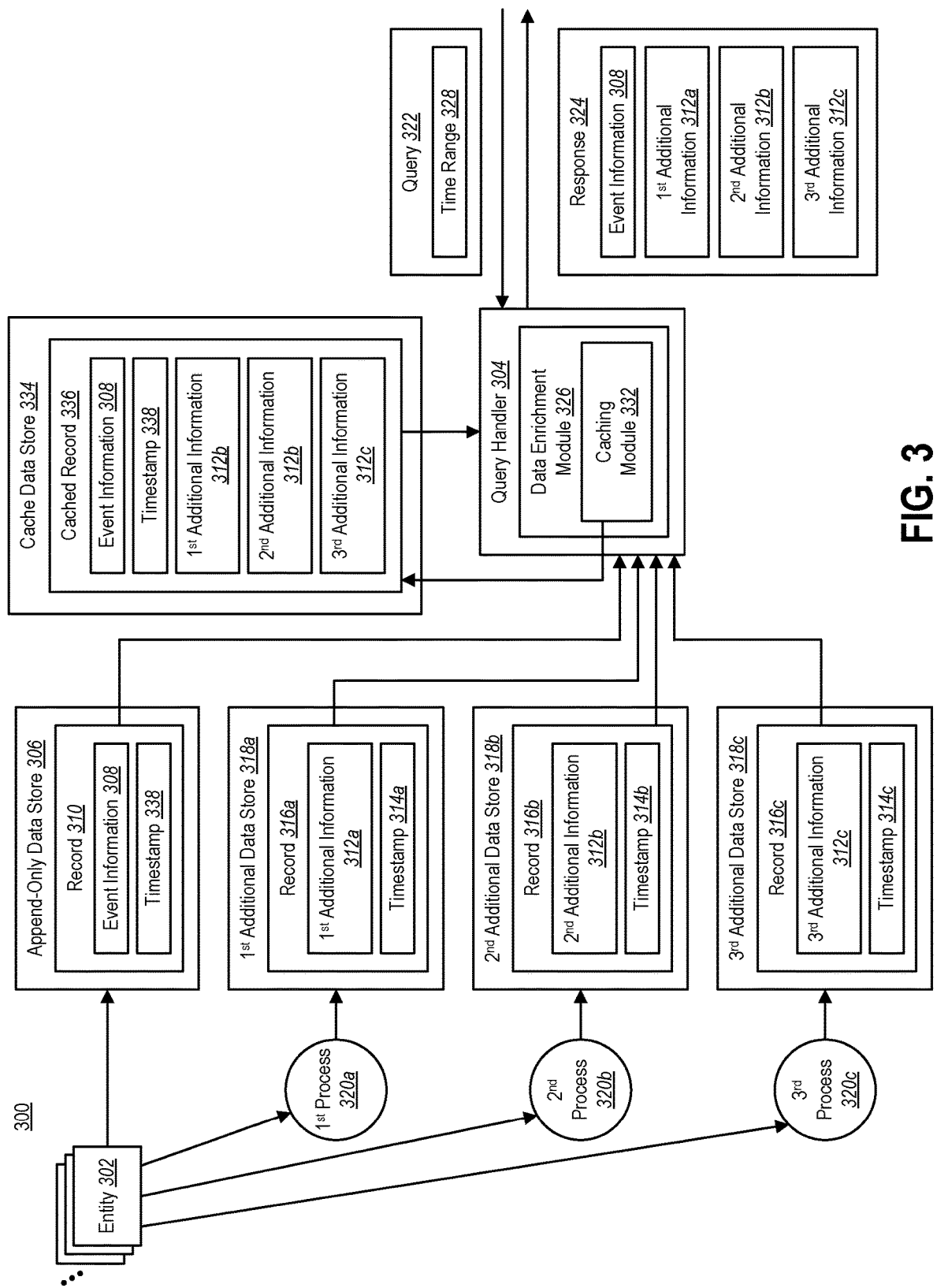
FIG. 3 illustrates another example of a system that implements an asynchronous data enrichment process in accordance with the present disclosure and that also implements caching.

FIG. 3 illustrates an example of a system 300 that is similar in some respects to the systems 100, 200 discussed previously, but that also implements caching. The system 300 includes a plurality of entities 302. A query handler 304 receives and responds to queries for information about the entities 302. Information about events related to the entities 302 is written to an append-only data store 306. When an event occurs with respect to a particular entity 302, event information 308 (and a corresponding timestamp 338) may be written to a record 310 in the append-only data store 306. A plurality of processes including a first process 320a, a second process 320b, and a third process 320c monitor the entities 302 and write additional information 312a-c (and corresponding timestamps 314a-c) to additional data stores 318a-c. The additional data stores 318a-c may be append-only data stores. Alternatively, at least some of the additional data stores 318a-c may be configured so that existing records can be modified.

In the system 300 shown in FIG. 3, the data enrichment module 326 includes a caching module 332. The caching module 332 may be configured to cache the event information 308 and at least some of the additional information 312a-c to a cache data store 334. The caching operation for a particular event may occur a predefined time period after event information 308 is written to the append-only data store 306. In addition to the event information 308, as much of the additional information 312a-c that is available when the caching operation is performed may also be written to the cache data store 334.

In the depicted example, it will be assumed that the event information 308 from the record 310 in the append-only data store 306, the first additional information 312a from the record 316a in the first additional data store 318a, the second additional information 312b from the record 316b in the second additional data store 318b, and the third additional information 312c from the record 316c in the third additional data store 318c have been cached.

The cache data store 334 includes a cached record 336 that includes the event information 308 and the timestamp 338 from the record 310 in the append-only data store 306. The cached record 336 also includes the first additional information 312a from the record 316a in the first additional data store 318a, the second additional information 312b from the record 316b in the second additional data store 318b, and the third additional information 312c from the record 316c in the third additional data store 318c.

As discussed above, in response to receiving a query 322 for event information 308 that is associated with an entity 302 and that corresponds to a particular time range 328, the event information 308 may be combined with additional information 312a-c that is relevant to the query 322 and that corresponds to the specified time range. This process of combining the event information 308 with the additional information 312a-c may include searching the cache data store 334.

For example, assuming that the timestamp 338 of the cached record 336 is within the time range 328 that is specified by the query 322, the data enrichment module 326 may access the cache data store 334 to retrieve the event information 308, the first additional information 312a, the second additional information 312b, and the third additional information 312c. The data enrichment module 326 may combine all of this information together so that the response 324 to the query 322 includes the event information 308, the first additional information 312a, the second additional information 312b, and the third additional information 312c.

Figure 4:
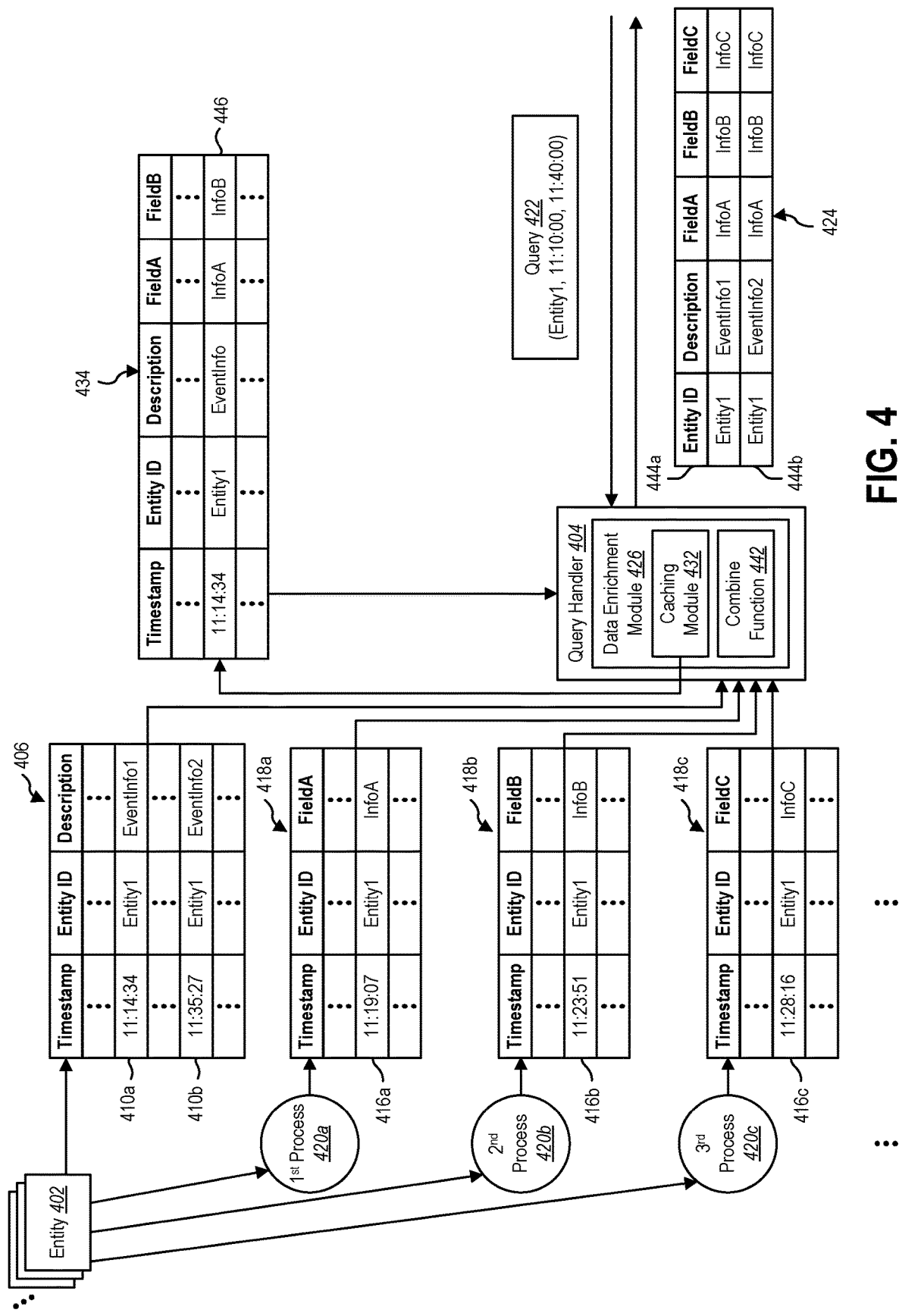
FIG. 4 illustrates a more detailed example of the system shown in FIG. 3.

FIG. 4 illustrates another example of a system 400 in which aspects of the present disclosure may be utilized. The system 400 is similar in some respects to the system 300 shown in FIG. 3. The system 400 includes a plurality of entities 402. A query handler 404 receives and responds to queries for information about the entities 402. Information about events related to the entities 402 is written to an append-only data store. In the depicted example, the append-only data store is an append-only table 406. This table 406 will be referred to herein as an events table 406.

When an event occurs with respect to a particular entity 402 (e.g., "Entity1"), some information about the event (which is represented as "EventInfo1" and "EventInfo2" in FIG. 4) may be written to one or more records 410a-b in the events table 406. If additional information that may be useful for analyzing an event subsequently becomes available, this additional information may be written to additional data stores. In FIG. 4, these additional data stores are represented as additional tables. FIG. 4 shows first additional information (which is represented as "InfoA") and a corresponding timestamp being written to a record 416a in a first additional table 418a, second additional information (which is represented as "InfoB") and a corresponding timestamp being written to a record 416b in a second additional table 418b, and third additional information (which is represented as "InfoC") and a corresponding timestamp being written to a record 416c in a third additional table 418c. A plurality of processes (including a first process 420a, a second process 420b, and a third process 420c) monitor the entities 402 and write the additional information to the additional tables 418a-c.

The system 400 includes a data enrichment module 426 that combines the event information that is initially written to the events table 406 with the additional information that subsequently becomes available and is written to the additional tables 418a-c. The data enrichment module 426 includes a caching module 432. The caching module 432 may be configured to cache the event information and at least some of the additional information to a cache table 434.

A specific example will now be discussed in relation to the system 400 shown in FIG. 4. Some aspects of this example are similar to the example that was described above in connection with FIG. 2. For instance, it will be assumed that information about an event associated with an entity 402, which is represented as "EventInfo1", is written to a record 410a in the events table 406 at 11:14:34. At 11:19:07, a first process 420a determines additional information ("InfoA") about the event and writes this additional information to a record 416a in the first additional table 418a. At 11:23:51, a second process 420b determines additional information ("InfoB") about the event and writes this additional information to a record 416b in the second additional table 418b. At 11:28:16, a third process 420c determines additional information ("InfoC") about the event and writes this additional information to a record 416c in the third additional table 418c. At 11:35:27, information about another event associated with the entity 402, which is represented as "EventInfo2", is written to another record 410b in the events table 406.

The data enrichment module 426 includes a combine function 442 that identifies all of the information in the events table 406 and the additional tables 418a-c about a particular entity (e.g., Entity1 in this example) corresponding to a specified time range. To perform caching related to a specific event, the caching module 432 may call the combine function 442 a predefined period of time after event information corresponding to the event has been written to the append-only table 406. The caching module 432 may then create a record 446 containing whatever information is returned by the combine function 442, and append this record 446 to the cache table 434.

The predefined period of time may be selected so that it is likely that most, if not all, of the additional information that is relevant to the event will be available before caching is performed. If all of the additional information that is relevant to the event becomes available before caching occurs, then all of this information can be written to a record 446 in the cache table 434.

In the depicted example, it will be assumed that the predefined period of time before caching is performed is fifteen minutes. The timestamp in the record 410 that includes the event information is 11:14:34. Fifteen minutes after this time is 11:29:34. Therefore, in the depicted example, caching may be performed at 11:29:34.

Suppose that a query 422 is received at 11:40:00. The query 422 is for event information associated with Entity1 that has a timestamp between 11:10:00 and the current time (i.e., 11:40:00 in this example). At least some of this information may be retrieved from the cache table 434. In particular, the event information from the events table 406 ("EventInfo1), the additional information from the first additional table 418a ("InfoA"), the additional information from the second additional table 418b ("InfoB"), and the additional information from the third additional table 418c ("InfoC") may be retrieved from the cache table 434.

To respond to the query 422, the data enrichment module 426 accesses the cache table 434 to determine the information that is stored in the cache table 434 ("EventInfo1", "InfoA", "InfoB", and "InfoC"). As indicated above, caching was performed at 11:29:34. The query 422, however, asks for information through 11:40:00. Because the time range specified in the query 422 extends beyond the time when caching was performed, the data enrichment module 426 also calls the combine function 442 to determine the requested information from the events table 406 and the additional tables 418a-c. This returns "EventInfo2" from the events table 406 and "InfoA", "InfoB", and "InfoC" from the additional tables 418a-c. The response 424 to the query 422 includes a record 444a with the information from the cache table 434. The response 424 to the query 422 also includes a record 444b with the information from the events table 406 and the additional tables 418a-c.

In the example that was just discussed, some of the information that is provided in response to the query 422 is retrieved by searching the cache table 434, while other information is retrieved by searching the events table 406 and the additional tables 418a-c. In some situations, however, all of the information that is provided in response to the query 422 may be retrieved from the cache table 434. In other situations, all of the information that is provided in response to the query 422 may be retrieved by searching the events table 406 and the additional tables 418a-c. In other words, the information that is provided in response to the query 422 may be determined from (a) the cache table 434, (b) the events table 406 and the additional tables 418a-c, or (c) a combination of (a) and (b). Whether scenario (a), (b), or (c) applies depends on the time range that is specified in the query 422 and how recently caching has been performed.

Scenario (a) occurs when both the start time and the end time of the time range specified by the query 422 are earlier than the time at which caching is performed. Scenario (b) occurs when both the start time and the end time of the time range specified by the query 422 are later than the time at which caching is performed. Scenario (c) occurs when the start time of the time range specified by the query 422 is earlier than the time at which caching is performed, but the end time of the time range specified by the query 422 is later than the time at which caching is performed.

With respect to the example that is shown in FIG. 4, scenario (a) would occur if the query 422 asks for any information about Entity1 in the time range between 11:10:00 and 11:25:00. As indicated above, caching is performed at 11:29:34 in this example. Therefore, all of the requested information would be in the cache table 434, and the data enrichment module 426 would be able to obtain all of the information for responding to the query 422 from the cache table 434.

Scenario (b) would occur if the query 422 asks for any information about Entity1 in the time range between 11:30:00 and 11:40:00. Because caching was performed at 11:29:34 in this example, none of the requested information would be in the cache table 434. Therefore, the data enrichment module 426 would obtain all of the information for responding to the query 422 by searching the events table 406 and the additional tables 418a-c.

Scenario (c) was discussed previously. Information corresponding to the time range between 11:10:00 and the time when caching was performed (11:29:34 in this example) is retrieved by searching the cache table 434, while other information corresponding to the time range specified in the query 422 is retrieved by searching the events table 406 and the additional tables 418a-c.

Figure 5:
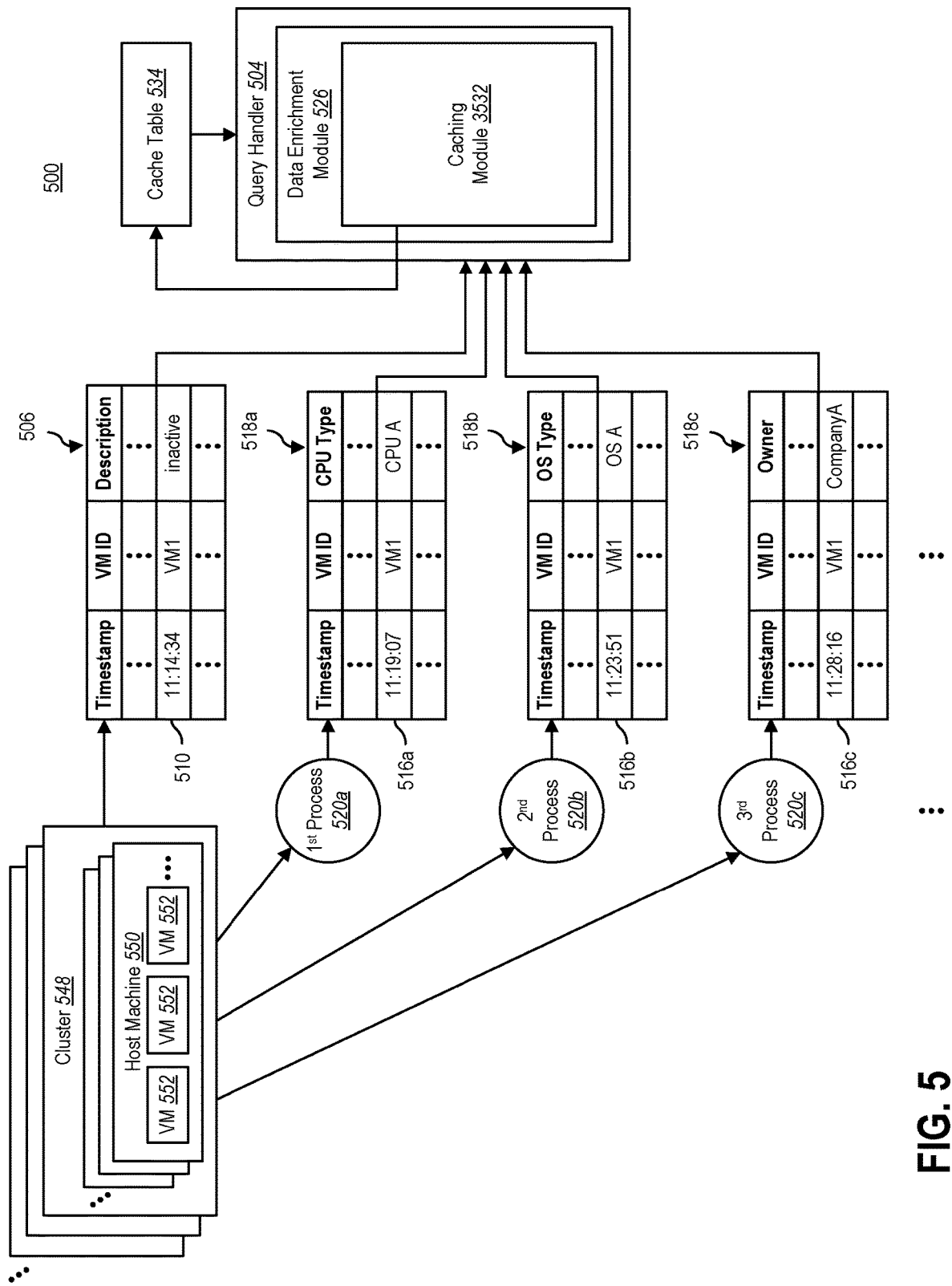
FIG. 5 illustrates another example of a system that implements an asynchronous data enrichment process in accordance with the present disclosure, in which the entities that are being monitored are components of a cloud computing system.

FIG. 5 illustrates another example of a system 500 in which aspects of the present disclosure may be utilized. In the depicted system 500, the entities that are being monitored are components of a cloud computing system. The system 500 includes a plurality of clusters 548. Each cluster 548 includes a plurality of host machines 550, which may also be referred to as nodes. Each host machine 550 includes a plurality of virtual machines (VMs) 552. The system 500 includes a query handler 504 that is configured to receive and respond to queries for information about the VMs 552. In some embodiments, the query handler 504 may be part of a service that facilitates cloud analytics. The cloud analytics service may apply data analysis techniques to big data, as discussed above.

Information about events related to the VMs 552 may be written to an append-only table 506, which may be referred to herein as an events table 506. In some embodiments, the information about the VMs 552 includes an indication about whether the VMs 552 are currently active. For example, when a particular VM 552 shuts down unexpectedly, an indication about this unexpected shutdown may be written to a record 510 in the events table 506.

There may be additional information that may be useful for analyzing the unexpected shutdown of the VM 552. However, this additional information may not be available when the indication of the unexpected shutdown is written to the record 510 in the events table 506. Moreover, it may not necessarily be known in advance when, or even if, the additional information will become available. If the additional information does become available, it may be written to other tables. FIG. 5 shows first additional information (e.g., a CPU type) and a corresponding timestamp being written to a record 516*a* in a first additional table 518*a*, second additional information (e.g., an operating system type) and a corresponding timestamp being written to a record 516*b* in a second additional table 518*b*, and third additional information (e.g., an owner of the VM 552) and a corresponding timestamp being written to a record 516*c* in a third additional table 518*c*. A plurality of processes (including a first process 520*a*, a second process 520*b*, and a third process 520*c*) may monitor the VMs 552 and write the additional information to the additional tables 518*a-c*.

The system 500 includes a data enrichment module 526 that combines the event information (e.g., the indication about the unexpected shutdown) that is initially written to the events table 506 with the additional information that subsequently becomes available and is written to the additional tables 518*a-c*. The data enrichment module 526 includes a caching module 532 that caches, after a predefined time period, all of the information that has been received about a particular event. Caching may be performed similarly to the way that caching was described above in connection with FIG. 4. The information that is cached may be written to a cache table 534.

When a query is received, the data enrichment module 526 may combine the event information that was initially written to the events table 506 with the additional information that subsequently becomes available. Under some circumstances, this information may be retrieved from the cache table 534. All of this information may be combined into a single record and provided in a response to the query.

Figure 6:
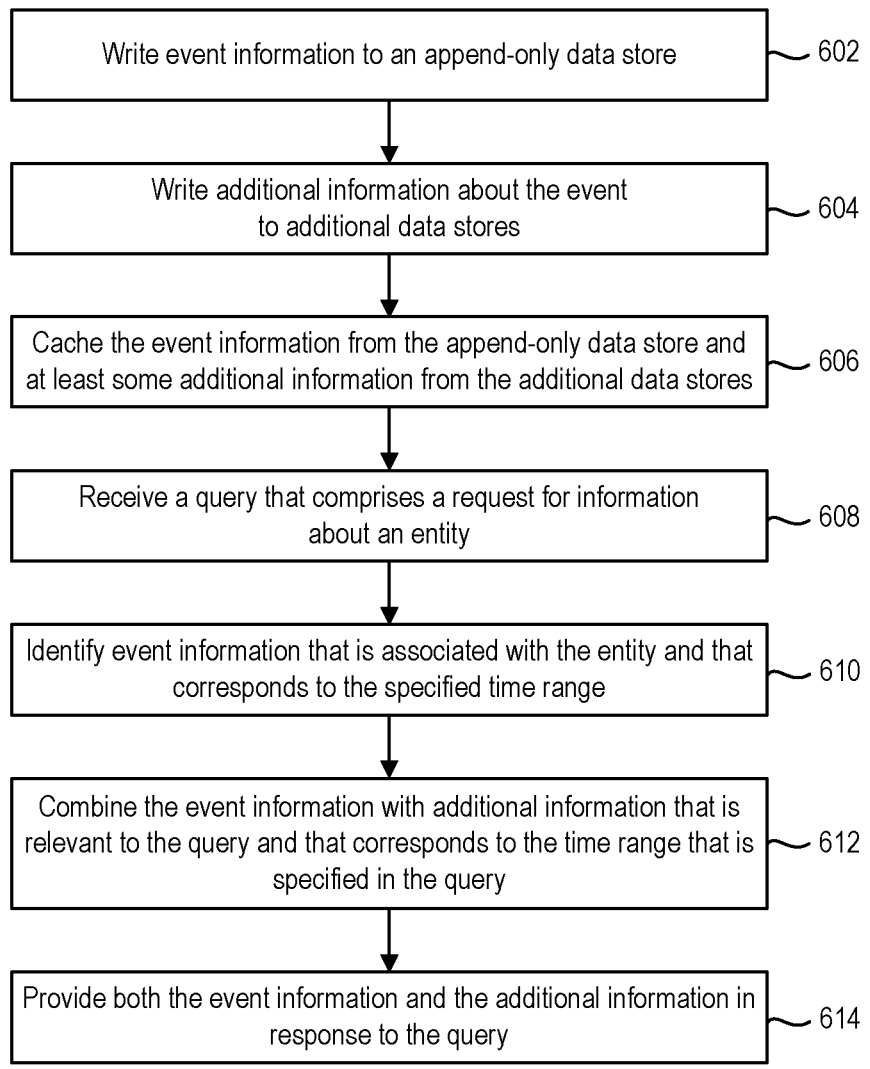
FIG. 6 illustrates an example of a method for asynchronous data enrichment in accordance with the present disclosure.

FIG. 6 illustrates an example of a method 600 for asynchronous data enrichment in accordance with the present disclosure. The method 600 will be discussed in relation to the system 300 shown in FIG. 3. The method 600 may be performed in connection with a system 300 in which information about events related to a plurality of entities 302 is written to an append-only data store 306, and additional information 312*a-c* is written to one or more additional data stores 318*a-c*.

Step 602 includes writing event information 308 corresponding to an event that occurs in connection with a particular entity 302 to a record 310 in an append-only data store 306. Step 604 includes writing additional information 312*a-c* about the event to additional data stores 318*a-c*. As discussed above, the additional information 312*a-c* may become available after the event information 308 is written to the append-only data store 306, such that the additional information 312*a-c* is not included in the record 310 in the append-only data store 306.

Step 606 of the method 600 includes caching, to a cache data store 334, event information 308 from the append-only data store 306 and additional information 312*a-b* from the additional data stores 318*a-c*. As discussed above, this caching may be performed a predefined period of time after the event information 308 is written to the append-only data store 306. The predefined period of time may be selected so that it is likely that most, if not all, of the additional information that is relevant to the event will be available before caching is performed. Under some circumstances, however, some additional information may become available after caching is performed.

Step 608 includes receiving a query 322 that includes a request for information about an entity 302. The query 322 may specify a particular time range 328.

Step 610 includes identifying event information 308 that is associated with the entity 302 that is specified in the query 322 and that corresponds to the time range 328 that is specified in the query 322. Step 612 includes combining the event information 308 with additional information 312*a-c* that is relevant to the query 322 and that corresponds to the time range 328 that is specified in the query 322.

Step 614 includes providing both the event information 308 and the additional information 312*a-c* in response to the query 322. In some embodiments, the event information 308 and the additional information 312*a-c* may be combined into a single record. As discussed above, the information that is provided in response to the query 322 may be obtained from (a) the cache data store 334, (b) the append-only data store 306 that includes the event information and the additional data stores 318*a-c* that include the additional information 312*a-c*, or (c) a combination of (a) and (b). Whether scenario (a), (b), or (c) applies depends on the time range that is specified in the query 322 and how recently caching has been performed.

Figure 7:
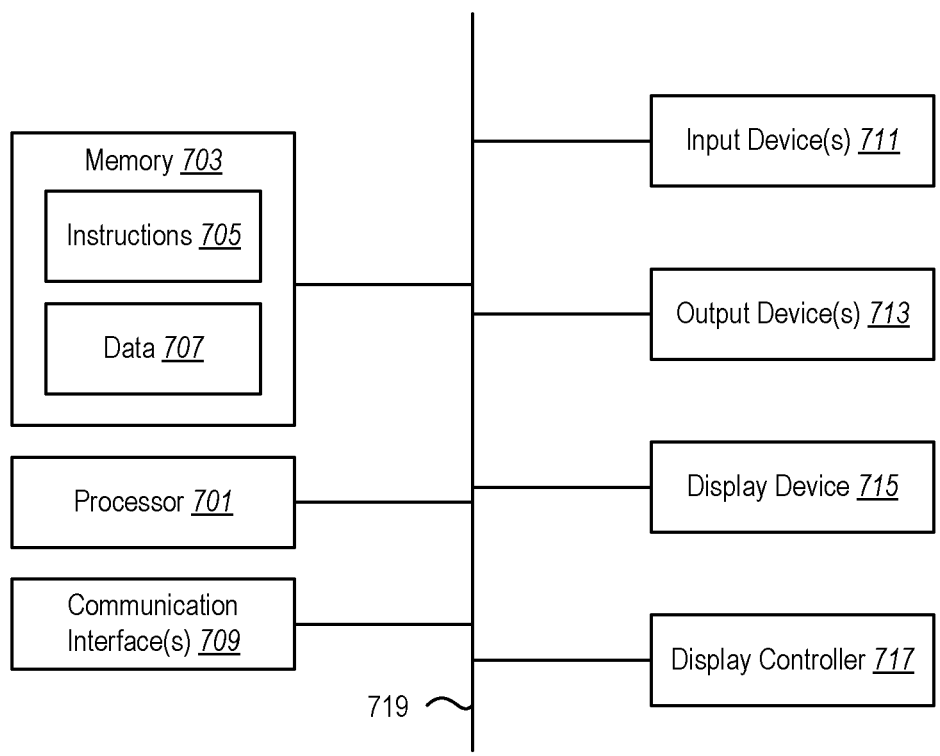
FIG. 7 illustrates certain components that may be included within a computer system that may be used to implement the various devices, components, and systems described herein.

FIG. 7 illustrates certain components that may be included within a computer system 700. One or more computer systems 700 may be used to implement the various devices, components, and systems described herein.

The computer system 700 includes a processor 701. The processor 701 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the steps, operations, actions, or other functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 702.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory computer-readable medium having computer-executable instructions stored thereon that, when executed by at least one processor, perform some or all of the steps, operations, actions, or other functionality disclosed herein. The instructions may be organized into routines, programs, objects, components, data structures, etc., which may perform particular tasks and/or implement particular data types, and which may be combined or distributed as desired in various embodiments.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for asynchronous data enrichment for an append-only data store, comprising:
   receiving a query for event information regarding an event associated with an entity, wherein the query specifies an entity identifier and a time range;
   identifying the event information that is associated with the entity and that corresponds to the specified time range, wherein the event information is initially written to a record in the append-only data store, wherein the record in the append-only data store comprises the entity identifier, and wherein the append-only data store is configured so that the record cannot be modified after the record has been written to the append-only data store;
   a predetermined time after the event, caching the event information in a cached record in a cache data store;
   as additional information that is relevant to the query and that corresponds to the specified time range becomes available, combining the event information with the additional information in the cached record, wherein the additional information corresponding to the specified time range becomes available after the record comprising the event information has been written to the append-only data store and the cached record, wherein the additional information is written to one or more additional records in one or more additional data stores, wherein the one or more additional records in the one or more additional data stores also comprise the entity identifier, and wherein the one or more additional data stores are separate from the append-only data store; and providing a response to the query from the cached record that comprises both the event information and the additional information.

2. The method of claim 1, wherein combining the event information with the additional information comprises searching the cache data store.

3. The method of claim 1, wherein combining the event information with the additional information comprises searching the append-only data store and the one or more additional data stores.

4. The method of claim 1, wherein providing the response to the query comprises:
   searching the cache data store; and
   searching the append-only data store and the one or more additional data stores.

5. The method of claim 1, wherein:
   the event information is associated with one or more timestamps; and
   all timestamps associated with the additional information occur after the one or more timestamps associated with the event information.

6. The method of claim 1, wherein the entity identifier specified by the query identifies a component of a cloud computing system, and wherein the method further comprises:
   monitoring a plurality of components of the cloud computing system; and
   writing information about events related to the plurality of components of the cloud computing system to the append-only data store.

7. A non-transitory computer-readable medium comprising instructions that are executable by one or more processors to cause a computing system to:
   receive a query for event information regarding an event associated with an entity, wherein the query specifies an entity identifier and a time range;
   identify the event information that is associated with the entity and that corresponds to the specified time range, wherein the event information is initially written to a record in an append-only data store, wherein the record in the append-only data store comprises the entity identifier, and wherein the append-only data store is configured so that the record cannot be modified after the record has been written to the append-only data store;
   a predetermined time after the event, cache the event information in a cached record in a cache data store;
   as additional information that is relevant to the query and that corresponds to the specified time range becomes available, combine the event information with the additional information in the cached record, wherein the additional information corresponding to the specified time range becomes available after the record comprising the event information has been written to the append-only data store and the cached record, wherein the additional information is written to one or more additional records in one or more additional data stores, wherein the one or more additional records in the one or more additional data stores also comprise the entity identifier, and wherein the one or more additional data stores are separate from the append-only data store; and
   provide a response to the query that comprises both the event information and the additional information.

8. The non-transitory computer-readable medium of claim 7, wherein combining the event information with the additional information comprises searching the cache data store.

9. The non-transitory computer-readable medium of claim 7, wherein combining the event information with the additional information comprises searching the append-only data store and the one or more additional data stores.

10. The non-transitory computer-readable medium of claim 7, wherein providing the response to the query comprises:
    searching the cache data store; and
    searching the append-only data store and the one or more additional data stores.

11. The non-transitory computer-readable medium of claim 7, wherein the computer-executable instructions comprise a combine function that combines:
    the event information in the append-only data store corresponding to a specified time period; and
    the additional information in the one or more additional data stores corresponding to the specified time period.

12. The non-transitory computer-readable medium of claim 11, wherein the computer-executable instructions further comprise a caching module that:
    calls the combine function;
    creates a record that comprises whatever information is returned by the combine function; and
    appends the record to a cache data store.

13. A system for asynchronous data enrichment, comprising:
    one or more processors;
    memory in electronic communication with the one or more processors; and
    instructions stored in the memory, the instructions being executable by the one or more processors to:
      receive a query for event information regarding an event associated with an entity, wherein the query specifies an entity identifier and a time range;
      identify the event information that is associated with the entity and that corresponds to the specified time range, wherein the event information is initially written to a record in an append-only data store, wherein the record in the append-only data store comprises the entity identifier, and wherein the append-only data store is configured so that the record cannot be modified after the record has been written to the append-only data store;
      a predetermined time after the event, cache the event information in a cached record in a cache data store;
      as additional information that is relevant to the query and that corresponds to the specified time range becomes available, combine the event information with the additional information in the cached record, wherein the additional information corresponding to the specified time range becomes available after the record comprising the event information has been written to the append-only data store and the cached record, wherein the additional information is written to one or more additional records in one or more additional data stores, wherein the one or more additional records in the one or more additional data stores also comprise the entity identifier, and wherein the one or more additional data stores are separate from the append-only data store; and
      provide a response to the query that comprises both the event information and the additional information.

14. The system of claim 13, wherein combining the event information with the additional information comprises searching the cache data store.

15. The system of claim 13, wherein combining the event information with the additional information comprises searching the append-only data store and the one or more additional data stores.

16. The system of claim 13, wherein providing the response to the query comprises:
   searching the cache data store; and
   searching the append-only data store and the one or more additional data stores.

* * * * *